United States Patent Office 3,376,348
Patented Apr. 2, 1968

3,376,348
PREPARATION OF ALKYL SULFIDES
George B. Stratton, Lewiston, N.Y., assignor to Hooker Chemical Corporation, Niagara Falls, N.Y., a corporation of New York
No Drawing. Filed Feb. 12, 1964, Ser. No. 344,239
11 Claims. (Cl. 260—609)

This invention relates to a novel process for preparing organic sulfides. More particularly, it is of the reaction of an olefin with a tertiary mercaptan in the presence of an azo catalyst.

There are numerous methods for preparing sulfides, such as by the free radical catalyzed abnormal addition of a mercaptan to an olefin in the presence of a peroxide or ultraviolet light. However, these reactions are difficult and expensive to accomplish. They result in low yields of a sulfide which is impure, and, the reaction is, also, very dangerous to effect, as high pressures have to be employed.

In accordance with the present invention there is provided a process for the preparation of an organic sulfide which comprises reacting an olefin with a tertiary mercaptan in the presence of an azo catalyst, as will be more fully described herein. The reaction occurring can be illustrated by the following equation which is not intended to be limiting.

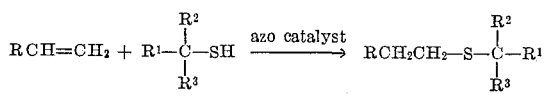

wherein, the substituents R, $R^1$, $R^2$ and $R^3$ are alkyl radicals.

Among the R, $R^1$, $R^2$ and $R^3$ alkyl substituents are, for example, alkyl radicals containing from 1 to about 20 carbon atoms, and preferably from 1 to about 10 carbon atoms, such as, methyl, ethyl, propyl, isopropyl, butyl, secondary butyl, tertiary butyl, pentyl, heptyl, octyl, decyl, pentadecyl, heptadecyl, eicosyl, and the like, said alkyl group being defined as a monovalent radical derived from an aliphatic hydrocarbon by the removal of one hydrogen atom. The R, $R^1$, $R^2$ and $R^3$ substituents may be the same or different.

The azo catalyst employed in the process of this invention includes those compounds containing the grouping —N=N—, said catalyst possessing from 6 to about 20 carbon atoms and preferably from 8 to about 14 carbon atoms. Illustrative examples of azo catalysts include alpha(carbamylazo)-alpha-methyl - enanthonitrile, alpha-(carbamylazo)isobutyramide, hexyl alpha(carbamylazo)-alpha, gamma-dimethylvalerate, alpha,alpha'-azodiisobutyronitrile, alpha,alpha'-azobis-(alpha,gamma-dimethylvaleronitrile), alpha,alpha'-azobis-(alpha-ethylbutyronitrile), alpha,alpha' - azobis(alpha - cyclohexylpropionitrile), alpha,alpha'-azobis(alpha,gamma-dimethylcapronitrile), 1,1'-azodicyclohexanecarbonitrile, 1,1'-azodicycloheptanecarbonitrile. A more detailed list of these types of catalyst appears in U.S. Patent 2,551,813. The preferred catalyst is alpha,alpha'-azodiisobutyronitrile.

Olefins which may be employed in the practice of the present invention include those olefins having a carbon chain length of from 2 to about 20 carbon atoms, and preferably of 2 to about 16 carbon atoms, such as, ethene, butene, pentene, octene, decene, dodecene, tetradecene, hexadecene, octene-1, dodecene-1, octadecene, eicosene, and the like, for example. Mixtures of olefins can, also, be utilized, if desired.

The mercaptan which reacts with the olefin will preferably be a tertiary mercaptan. Some commercially available tertiary mercaptans for this technique include tertiary butyl mercaptan, tertiary isopropylmercaptan, tertiary nonyl mercaptan, tertiary dodecylmercaptan and mixed tertiary mercaptans.

In general, the azo catalyst is present in the reaction system in amounts from 0.5 to 10 percent by weight based upon the weight of olefin, and preferably of from 1 to about 3 percent by weight. However, smaller amounts, for example, as low as .1 percent or less, are often effective and can be employed, if desired. Amounts about 10 percent or more may be used, but the relative expense of such large amounts of catalyst and the lack of significantly improved results generally precludes their use.

The ratio of olefin to mercaptan is in the range of from 0.2 to about 20 moles of olefin to 1 mole of mercaptan, with a preferred range being 1 to 10 and the most preferred ratio being about 1 mole olefin to 1 mole mercaptan.

Pressures are generally about atmospheric, but super or subatmospheric pressures may, also, be employed to effect the reaction.

The temperature at which the reaction is effected depends upon the catalyst and olefin being utilized, as well as on the reaction rate desired. Although temperatures within the range of from 40 degrees to 140 degrees centigrade have been illustrated in the examples, temperatures of from 30 degrees to 200 degrees centigrade can be used, depending upon the catalyst and the reaction rate desired. The reaction rate is high at temperatures at which the particular catalyst employed is considered to decompose rapidly into the fragments which initiate the reaction. With a given catalyst, an increase in temperature generally results in a higher reaction rate. A plurality of azo catalysts may be employed to lengthen the active temperature range, if desired. Generally, the reaction takes place in approximately 30 minutes to around 15 hours, although the specific time employed may be varied.

In a preferred embodiment, the process of the present invention is illustrated by the following specific equation:

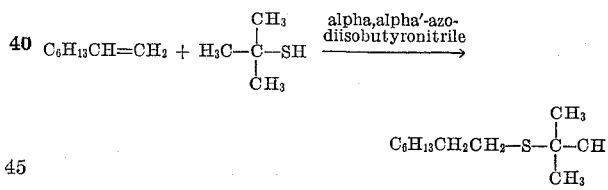

Sulfides which can be produced by the process of this invention include, for example, the following:

$CH_3CH_2CH_3$—$SC(CH_3)_3$
$C_2H_5(CH_2)_2$—$SC(C_3H_7)_3$
$C_4H_9CH_2CH_2SC(C_2H_5)_3$
$C_5H_{11}CH_2CH_2SC(CH_3)_3$

In order that those skilled in the art may better understand the present invention and the manner in which it may be practiced, the following illustrative examples are given.

In the specification, examples and claims, parts are by weight and temperatures are in degrees centigrade, unless otherwise stated.

EXAMPLE 1

Ten moles of α-octene ($C_8H_{16}$) and 11 moles of tertiary butyl-mercaptan were heated together in the presence of 5 grams of azobisisobutyronitrile (alpha,alpha'-azodiisobutyronitrile) for a period of about 30 hours and at a temperature of 55–60 degrees centigrade. The product was recovered by distillation and the recovered olefin is recycled, used again in the next such reaction. The n-octyl tertiary butylsulfide product was obtained in a yield of 97.5 percent.

In a similar manner to the above and at substantially the same proportion, α-decene is employed in the place of octene resulting in n-decane tertiary butyl sulfide.

EXAMPLE 2

One mole of a mixture of α-olefins containing 7 to 9 carbons and 1.1 moles of tertiary butyl mercaptan were reacted together in the presence of one-half gram of azobisisobutyronitrile at a temperature of 60 degrees centigrade for a period of 35 hours. The product was recovered by distillation and the recovered olefin was recycled back into the next reaction system. The mixed alkyl tertiary butyl sulfide is obtained in 87 percent yield on recycling.

In a similar manner to the above and at substantially the same proportion, a mixture of α-olefins containing 11–15 carbons is employed in the place of the olefin mixture containing 7 to 9 carbon atoms, resulting in normal tertiary butyl sulfides containing from 15 to 19 carbon atoms.

EXAMPLES 3–10

The procedure of Example 1 is repeated and the following reactions are effected to produce the products shown with tertiary butyl mercaptan

| Example Number | Reactants | Moles | Catalyst | Product |
|---|---|---|---|---|
| 3 | Alpha dodecene tert. butyl mercaptan. | 1:1.1 | ½ gm. azobisisobutryonitrile, 24 hrs., 60° C. | n-Dodecyl tert. butyl sulfide 93% yield on recycle. |
| 4 | Mixture of alpha olefins containing from 11-15 carbons and tertiary butyl mercaptan. | 1:1.1 | ½ gm. azobisisobutryonitrile, 24 hrs., 60° C. | A normal olefin tert. butyl sulfide containing from 15 to 19 carbon atoms. |
| 5 | Mixture of alpha olefins containing from 11-15 carbon atoms and tertiary butyl mercaptan. | 1:15 | ½ gm. azobisisobutryonitrile, 24 hrs., 60° C. | A normal tertiary butyl sulfide containing from 15-19 carbon atoms. 80% yield on recycle. |
| 6 | Mixture of alpha olefins containing from 11-15 carbon atoms and tertiary butyl mercaptan. | 3:3.3 | 2 gms. azobisisobutryonitrile, 33 hrs., 62° C. | A normal olefin tertiary butyl sulfide containing from 15-19 carbon atoms. 85% to 88% yield on recycle. |
| 7 | Mixture of alpha olefins containing from 11-15 carbon atoms and tertiary butyl mercaptan. | 10:11 | 7.5 gms. azobisisobutryonitrile, 53 hrs., 60° C. | A normal olefin tert. butyl sulfide containing from 15-19 carbon atoms. 85%-88% yield on recycle. |
| 8 | Alpha octene and tert. butyl sulfide. | 10:11 | 5 gms. azobisisobutryonitrile, 40 hrs., 60° C. | A normal octyl tert. butyl sulfide 90% yield on recycle. |
| 9 | do | 10:11 | 5 gms. alpha,alpha'-azobis(alphacyclohexopropionitrile). | |
| 10 | Alpha dodecene and tert. butyl sulfide. | 1:1.1 | Hexo-alpha(carbamylazo)-alpha,gamma-dimethyl-valerate, 24 hrs., 60° C. | n-Dodecyl tertiary butyl sulfide. Greater than 90% yield. |

4. A process in accordance with claim 1 wherein a mixture of olefins containing from 11 to 15 carbon atoms is utilized.

5. A process in accordance with claim 1 wherein the reaction is effected at a temperature of from 40 degrees centigrade to 140 degrees centigrade.

6. A process in accordance with claim 5 wherein the reaction is effected at a temperature of from 50 degrees centigrade to 70 degrees centigrade.

7. A process according to claim 5 wherein the azo catalyst is selected from the group consisting of alpha (carbamylazo)alpha-methylenanthonitrile, alpha(carbamylazo)isobutyramide, hexyl alpha(carbamylazo)-alpha, gamma-dimethylvalerate, alpha, alpha'-azodiisobutyronitrile, alpha, alpha'-azobis-(alpha, gamma-dimethylvaleronitrile), alpha, alpha'-azobis-(alpha-ethylbutyronitrile), alpha, alpha'-azobis(alpha-cyclohexylpropinonitrile), alpha, alpha'-azobis(alpha, gamma-dimethylcapronitrile), 1,1'-azodicyclohexanecarbonitrile, 1,1'-azodicycloheptanecarbonitrile.

8. A process according to claim 7, wherein the azo catalyst employed is alpha, alpha'-azodiisobutyronitrile.

While there have been described various embodiments of the invention, the methods and elements described are not to be understood as limiting the scope of the invention, as it is realized that changes therein are possible by one of ordinary skill in the art.

What is claimed is:

1. A process for the preparation of an organic sulfide of the formula

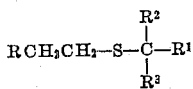

which comprises reacting a compound of the formula $$RCH=CH_2$$

with a compound of the formula

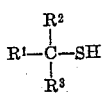

in the presence of an azo catalyst of 6 to 20 carbon atoms; wherein the substituents R, $R^1$, $R^2$ and $R^3$ are alkyl radicals of 1 to 20 carbon atoms.

2. A process in accordance with claim 1 wherein the olefin utilized is α-octene.

3. A process in accordance with claim 1 wherein a mixture of olefins containing from 7 to 9 carbon atoms is utilized.

9. A process for the preparation of an organic sulfide of the formula

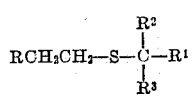

which comprises reacting a compound of the formula $$RCH=CH_2$$

with a compound of the formula

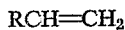

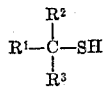

wherein the substituents R, $R^1$, $R^2$ and $R^3$ are alkyl radicals of from 1 to 20 carbon atoms, in the presence of azobisisobutyronitrile.

10. A process for the preparation of the compound

which comprises reacting the compound

with the compound

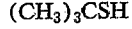

in the presence of azobisisobutyronitrile and at a temperature of 70 degrees centigrade.

11. An integrated process for the preparation of sulfides which comprises reacting at a temperature of 40 degrees centigrade to 140 degrees centigrade a compound of the formula $RCH=CH_2$ with a compound of the formula:

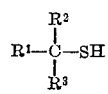

wherein R, $R^1$, $R^2$ and $R^3$ are alkyl radicals of 1 to 20 carbon atoms in the presence of an azo catalyst of 6 to 20 carbon atoms, isolating the sulfide product from the reaction mixture and recycling the olefin and unreacted tertiary mercaptan.

References Cited

UNITED STATES PATENTS

| | | | |
|---|---|---|---|
| 2,366,453 | 1/1945 | Meadow | 260—609 |
| 2,543,542 | 2/1951 | Badertscher et al. | 260—609 |
| 2,610,981 | 9/1952 | Short | 260—609 |
| 2,865,965 | 12/1958 | May et al. | 260—609 |

CHARLES B. PARKER, *Primary Examiner.*

D. PHILLIPS, *Assistant Examiner.*